US012767134B2

(12) United States Patent
Takahashi et al.

(10) Patent No.: US 12,767,134 B2
(45) Date of Patent: Oct. 20, 2026

(54) MOBILE BODY CONTROL DEVICE, MOBILE BODY CONTROL METHOD, AND NON-TRANSITORY COMPUTER-READABLE STORAGE MEDIUM

(71) Applicant: HONDA MOTOR CO., LTD., Tokyo (JP)

(72) Inventors: Sho Takahashi, Tokyo (JP); Masafumi Amano, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/978,586

(22) Filed: Dec. 12, 2024

(65) Prior Publication Data

US 2025/0196860 A1 Jun. 19, 2025

(30) Foreign Application Priority Data

Dec. 13, 2023 (JP) ................................ 2023-210294

(51) Int. Cl.
*B60W 30/165* (2020.01)
*B60W 30/14* (2006.01)

(52) U.S. Cl.
CPC ........ *B60W 30/165* (2013.01); *B60W 30/143* (2013.01); *B60W 2510/184* (2013.01);
(Continued)

(58) Field of Classification Search
CPC .............. B60W 50/0098; B60W 50/02; B60R 16/0231
See application file for complete search history.

(56) References Cited

U.S. PATENT DOCUMENTS 6,658,344 B2 * 12/2003 Hirasago ............... B60W 50/14 180/170
7,668,638 B2 2/2010 Saeki
(Continued)

FOREIGN PATENT DOCUMENTS

CN 110194165 B * 6/2022 ........ B60W 60/0053
CN 114906148 A * 8/2022 ............ B60W 10/18
(Continued)

OTHER PUBLICATIONS

CN-117901883-A translation (Year: 2024).*
(Continued)

*Primary Examiner* — Kyle T Johnson
(74) *Attorney, Agent, or Firm* — Armstrong Teasdale LLP

(57) ABSTRACT

A mobile body control device includes, an acceleration acquirer configured to acquire an actual acceleration of a mobile body, a gradient acquirer configured to acquire a gradient of a travel route, a preceding mobile body detector configured to detect a preceding mobile body, and a following controller configured to execute following control to calculate a target acceleration. The following controller is configured to start suppression control to calculate a corrected target acceleration by reducing an absolute value of the target acceleration on condition that a downward gradient of the travel route is equal to or more than a prescribed gradient determination value and a difference between the target acceleration and the actual acceleration is equal to or less than a prescribed difference determination value. While the following controller is executing the suppression control, a propulsion device and a brake device are controlled based on the corrected target acceleration.

11 Claims, 3 Drawing Sheets

(52) U.S. Cl.
CPC ... *B60W 2520/105* (2013.01); *B60W 2552/15* (2020.02); *B60W 2554/802* (2020.02)

(56) References Cited

U.S. PATENT DOCUMENTS

| | | | | |
|---|---|---|---|---|
| 9,758,164 | B2 * | 9/2017 | Shah | B60W 30/14 |
| 10,845,801 | B2 | 11/2020 | Konishi et al. | |
| 11,535,250 | B2 | 12/2022 | Horiguchi et al. | |
| 2006/0025918 | A1 | 2/2006 | Saeki | |
| 2010/0262408 | A1 * | 10/2010 | Taguchi | B60W 50/085 703/8 |
| 2012/0277967 | A1 * | 11/2012 | Isaji | B60W 50/0098 701/96 |
| 2016/0200297 | A1 * | 7/2016 | Yasutomi | B60T 7/12 701/70 |
| 2017/0015204 | A1 * | 1/2017 | Oguri | B60L 50/16 |
| 2017/0021832 | A1 * | 1/2017 | Nakadori | F02D 41/12 |
| 2017/0072955 | A1 * | 3/2017 | Ediger | B60W 30/143 |
| 2017/0297573 | A1 * | 10/2017 | Fraser | B60T 7/22 |
| 2017/0303842 | A1 * | 10/2017 | Yoshida | A61B 5/18 |
| 2019/0220007 | A1 | 7/2019 | Toshiyuki et al. | |
| 2019/0250629 | A1 * | 8/2019 | Mizuno | B60W 30/165 |
| 2022/0194373 | A1 | 6/2022 | Bang | |
| 2022/0229446 | A1 * | 7/2022 | Switkes | B60W 30/165 |
| 2023/0339493 | A1 * | 10/2023 | Nagasawa | G06V 20/56 |
| 2024/0227759 | A1 * | 7/2024 | Alenius | B60T 8/171 |
| 2025/0196860 | A1 * | 6/2025 | Takahashi | B60W 30/143 |

FOREIGN PATENT DOCUMENTS

| | | | | |
|---|---|---|---|---|
| CN | 117901883 | A * | 4/2024 | B60W 50/0098 |
| CN | 118833222 | A * | 10/2024 | B60W 50/0098 |
| CN | 120621366 | A * | 9/2025 | B60W 50/0098 |
| DE | 102016112841 | A1 * | 1/2017 | B60W 30/182 |
| DE | 112016003027 | T5 * | 3/2018 | B60W 50/082 |
| JP | 2006044326 | A | 2/2006 | |
| JP | 4161822 | B2 * | 10/2008 | |
| JP | 2019123320 | A | 7/2019 | |
| JP | 2020015349 | A | 1/2020 | |
| JP | 2021054275 | A | 4/2021 | |

OTHER PUBLICATIONS

DE-102016112841-A1 translation (Year: 2017).*
JP-4161822-B2 translation (Year: 2008).*
CN-118833222-A translation (Year: 2024).*
DE-112016003027-T5 translation (Year: 2018).*
A geometry driven car following distance estimation algorithm robust to road slopes (Year: 2019).*
Ecological_vehicel_control_on_roads_with_up-down_slopes (Year: 2011).*
Optimal_car_following_control_for_intelligent_vehicles (Year: 2021).*
CN-110194165-B translation (Year: 2022).*
CN-114906148-A translation (Year: 2022).*
CN-120621366-A translation (Year: 2025).*
Speed_gradient_approach_to_longitudinal (Year: 2002).*
Notice of Reasons for Refusal for Japanese Patent Application No. 2023-210294 dated Aug. 4, 2026; 6 pp.

* cited by examiner

MOBILE BODY CONTROL DEVICE, MOBILE BODY CONTROL METHOD, AND NON-TRANSITORY COMPUTER-READABLE STORAGE MEDIUM

TECHNICAL FIELD

The present invention relates to a mobile body control device, a mobile body control method, and a non-transitory computer-readable storage medium.

BACKGROUND ART

In recent years, there have been increasing efforts to provide sustainable transportation systems that take into consideration vulnerable people among transport participants. To achieve this goal, research and development for driving assistance technologies and autonomous driving technologies is conducted to further improve traffic safety and convenience.

Japanese Patent No. 4161822 discloses a vehicle control device that executes following travel to follow a preceding vehicle. This vehicle control device switches a control map between a normal map and a fade suppression map based on the temperature of a brake pad. When the fade suppression map is selected, acceleration/deceleration control becomes less responsive than when the normal map is selected. Accordingly, the use of a brake is reduced, so that the fade of the brake is suppressed.

However, if the control based on the fade suppression map continues, the following ability to follow the preceding vehicle may deteriorate, and the vehicle may not be able to follow the preceding vehicle.

SUMMARY OF THE INVENTION

In view of the above background, an object of the present invention is to provide a mobile body control device, a mobile body control method, and a non-transitory computer-readable storage medium that can maintain the following ability to follow a preceding mobile body while suppressing the fade of a brake device. Accordingly, an aim of the present invention is to contribute to the development of sustainable transportation systems.

To achieve such an object, one aspect of the present invention provides a mobile body control device (15) configured to execute travel control of a mobile body (1), the mobile body control device comprising: an acceleration acquirer (42) configured to acquire an actual acceleration of the mobile body; a gradient acquirer (43) configured to acquire a gradient of a travel route along which the mobile body is traveling; a preceding mobile body detector (44) configured to detect a preceding mobile body moving ahead of the mobile body; and a following controller (45) configured to execute following control to calculate a target acceleration for controlling a propulsion device and a brake device such that the mobile body follows the preceding mobile body, wherein the following controller is configured to calculate the target acceleration based on a target distance and a distance between the mobile body and the preceding mobile body, and to start suppression control to calculate a corrected target acceleration by reducing an absolute value of the target acceleration on condition that a downward gradient of the travel route is equal to or more than a prescribed gradient determination value and a difference between the target acceleration and the actual acceleration is equal to or less than a prescribed difference determination value, and while the following controller is executing the suppression control, the propulsion device and the brake device are controlled based on the corrected target acceleration instead of the target acceleration.

According to this aspect, it is possible to provide a mobile body control device that can maintain the following ability to follow a preceding mobile body while suppressing the fade of a brake device. By executing the suppression control, the increase in an acceleration becomes slower, so that the distance between the mobile body and the preceding mobile body is prevented from becoming shorter. Accordingly, the use of the brake device is reduced, so that the temperature rise and fade of the brake device is suppressed. When the suppression control is executed, the difference between the target acceleration and the actual acceleration is equal to or less than the difference determination value. Accordingly, even if the absolute value of the target acceleration is suppressed, the distance between the mobile body and the preceding mobile body is prevented from changing significantly.

In the above aspect, preferably, the following controller is configured to start the suppression control on condition that the downward gradient of the travel route is equal to or more than the prescribed gradient determination value, the difference between the target acceleration and the actual acceleration is equal to or less than the prescribed difference determination value, and the target acceleration is a value to increase a speed.

According to this aspect, it is possible to provide a mobile body control device that can maintain the following ability to follow a preceding mobile body (for example, a preceding vehicle) while suppressing the fade of a brake device. When the travel route has a downward gradient, the acceleration to increase a speed is applied to the mobile body due to the gravity. Accordingly, even if the target acceleration to increase a speed is suppressed, the following ability to follow the preceding mobile body is maintained.

In the above aspect, preferably, the following controller is configured to stop the following control when a temperature of the brake device is equal to or more than a prescribed temperature determination value.

According to this aspect, the used of the brake device according to the following control is stopped, so that the fade is suppressed.

In the above aspect, preferably, the following controller is configured to calculate the target acceleration such that the distance between the mobile body and the preceding mobile body gets close to the target distance.

According to this aspect, the following controller can cause the distance between the mobile body and the preceding mobile body to get close to the target distance.

In the above aspect, preferably, the following controller is configured to stop the suppression control when the difference between the target acceleration and the actual acceleration becomes more than the prescribed difference determination value.

According to this aspect, the following controller can maintain the following ability to follow the preceding mobile body. When the difference between the target acceleration and the actual acceleration is more than the difference determination value, the distance between the preceding mobile body and the mobile body is more likely to change. In such a case, the following controller stops the suppression control to improve the responsiveness of the acceleration.

In the above aspect, preferably, the following controller is configured to stop the suppression control when an input operation on a driving operation device is detected, the driving operation device being configured to accept a driving operation by an occupant of the mobile body.

According to this aspect, the occupant can stop the suppression control by his/her own operation.

In the above aspect, preferably, the following controller is configured to stop the following control when the preceding mobile body ceases to be a following target.

According to this aspect, the following controller can stop unnecessary following control to follow a peripheral mobile body that is not a following target.

In the above aspect, preferably, after the suppression control is stopped, the following controller is configured to execute a return process to suppress a changing amount of an absolute value of the target acceleration.

According to this aspect, when the suppression control is stopped, the acceleration is prevented from changing suddenly.

In the above aspect, preferably, in the return process, the following controller is configured to suppress the changing amount of the absolute value of the target acceleration based on the difference between the target acceleration and the actual acceleration.

According to this aspect, when the suppression control is stopped, the acceleration is prevented from changing suddenly.

In the above aspect, preferably, the mobile body control device further comprises a notifier configured to notify an occupant of the mobile body that the suppression control is being executed when the following controller is executing the suppression control.

According to this aspect, the occupant can recognize that the suppression control is being executed, and is less likely to feel uncomfortable.

Another aspect of the present invention provides a mobile body control method executed by a computer to execute travel control of a mobile body, the mobile body control method comprising: acquiring an actual acceleration of the mobile body; acquiring a gradient of a travel route along which the mobile body is traveling; detecting a preceding mobile body moving ahead of the mobile body; executing following control to calculate a target acceleration for controlling a propulsion device and a brake device such that the mobile body follows the preceding mobile body; calculating the target acceleration based on a target distance and a distance between the mobile body and the preceding mobile body; and starting suppression control to calculate a corrected target acceleration by reducing an absolute value of the target acceleration on condition that a downward gradient of the travel route is equal to or more than a prescribed gradient determination value and a difference between the target acceleration and the actual acceleration is equal to or less than a prescribed difference determination value, wherein while the suppression control is being executed, the propulsion device and the brake device are controlled based on the corrected target acceleration instead of the target acceleration.

According to this aspect, it is possible to provide a mobile body control method that can maintain the following ability to follow a preceding mobile body (for example, a preceding vehicle) while suppressing the fade of a brake device.

Still another aspect of the present invention provides a non-transitory computer-readable storage medium comprising a program for executing travel control of a mobile body, wherein the program, when executed by a computer, executes a mobile body control method comprising: acquiring an actual acceleration of the mobile body; acquiring a gradient of a travel route along which the mobile body is traveling; detecting a preceding mobile body moving ahead of the mobile body; executing following control to calculate a target acceleration for controlling a propulsion device and a brake device such that the mobile body follows the preceding mobile body; calculating the target acceleration based on a target distance and a distance between the mobile body and the preceding mobile body; and starting suppression control to calculate a corrected target acceleration by reducing an absolute value of the target acceleration on condition that a downward gradient of the travel route is equal to or more than a prescribed gradient determination value and a difference between the target acceleration and the actual acceleration is equal to or less than a prescribed difference determination value, wherein while the suppression control is being executed, the propulsion device and the brake device are controlled based on the corrected target acceleration instead of the target acceleration.

According to this aspect, it is possible to provide a non-transitory computer-readable storage medium that can maintain the following ability to follow a preceding mobile body (for example, a preceding vehicle) while suppressing the fade of a brake device.

Thus, according to the above aspects, it is possible to provide a mobile body control device, a mobile body control method, and a non-transitory computer-readable storage medium that can maintain the following ability to follow a preceding mobile body while suppressing the fade of a brake device.

BRIEF DESCRIPTION OF THE DRAWING(S)

DETAILED DESCRIPTION OF THE INVENTION

Hereinafter, with reference to the drawings, an embodiment of a mobile body control device, a mobile body control method, and a non-transitory computer-readable storage medium according to the present invention will be described. A mobile body includes a vehicle such as an automobile, a truck, and a motorcycle, an electric kick scooter, and the like. In the present embodiment, an example in which the mobile body is a vehicle will be described.

Figure 1:
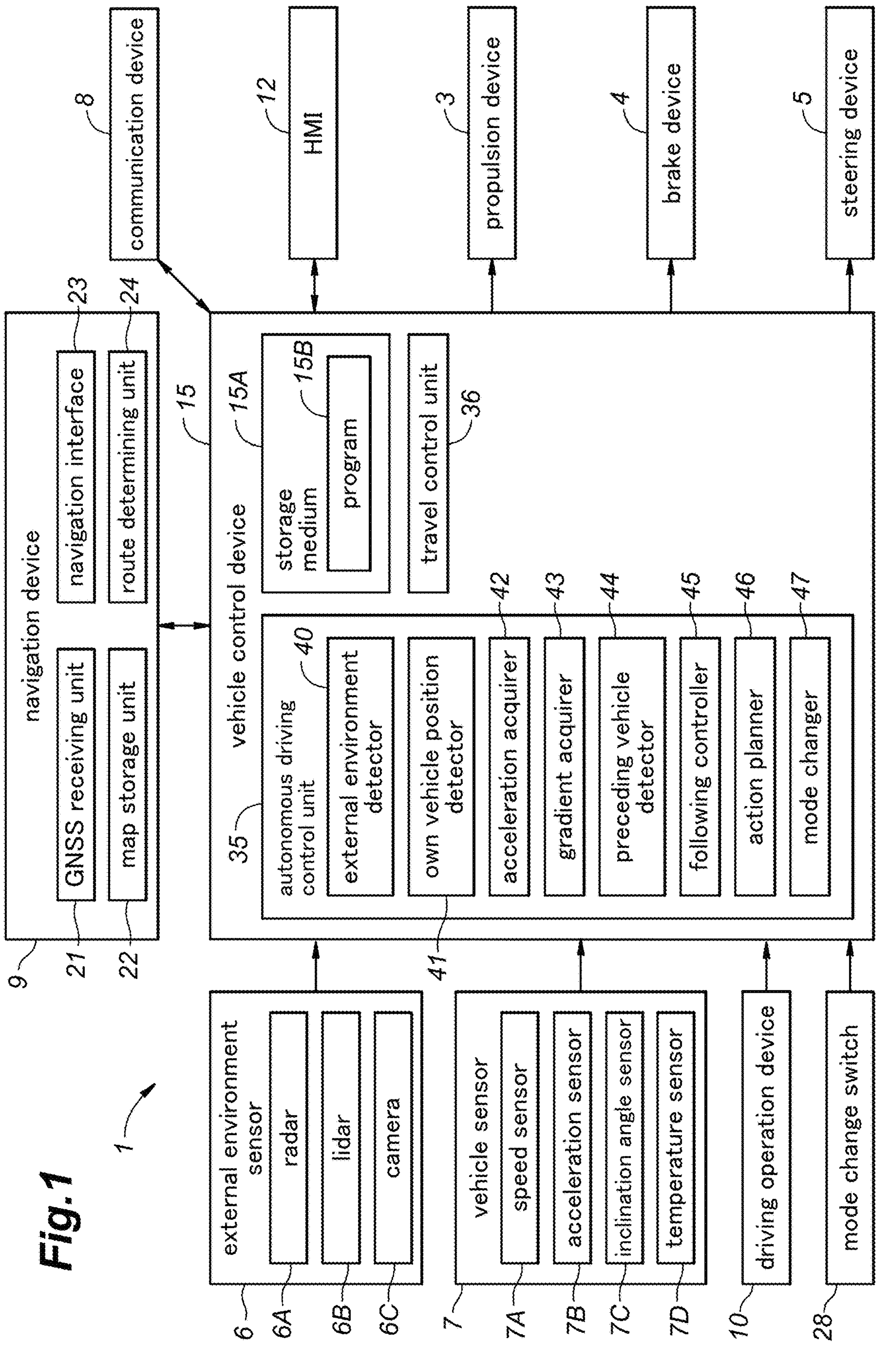
FIG. 1 is a block diagram of a vehicle in which a vehicle control device is installed.

As shown in FIG. 1, the vehicle 1 (mobile body) includes a propulsion device 3, a brake device 4, a steering device 5, an external environment sensor 6, a vehicle sensor 7, a communication device 8, a navigation device 9, a driving operation device 10, a human machine interface 12 (HMI), and a vehicle control device 15 (mobile body control device).

The propulsion device 3 is a device that applies a driving force to the vehicle 1, and includes, for example, a power source and a transmission. The power source includes at least one of an internal combustion engine such as a gasoline engine and a diesel engine, and an electric motor. The brake device 4 is a device that applies a braking force to the vehicle 1, and includes, for example, a brake caliper that presses a pad against a brake rotor, and an electric cylinder that supplies hydraulic pressure to the brake caliper. The brake device 4 may further include a parking brake device that restricts the rotation of wheels by a wire cable. The steering device 5 is a device that changes a steering angle of the wheels, and includes, for example, a rack-and-pinion mechanism that steers the wheels, and an electric motor that drives the rack-and-pinion mechanism. The propulsion device 3, the brake device 4, and the steering device 5 are controlled by the vehicle control device 15.

The external environment sensor 6 is a sensor that captures electromagnetic waves or light from the periphery of the vehicle 1 and detects objects and the like outside the vehicle 1. The external environment sensor 6 includes, for example, a radar 6A, a lidar 6B (LiDAR), and a camera 6C (external camera). The external environment sensor 6 outputs a detection result to the vehicle control device 15.

The radar 6A detects the position (distance and direction) of each object by emitting radio waves such as millimeter waves toward the periphery of the vehicle 1 and capturing the reflected waves thereof. At least one radar 6A is attached to any portion of the vehicle 1. It is preferable that the radar 6A includes at least a front radar that emits radio waves toward the front of the vehicle 1, a rear radar that emits radio waves toward the rear of the vehicle 1, and a pair of left and right side radars that emits radio waves toward the lateral sides of the vehicle 1.

The lidar 6B detects the position (distance and direction) of each object by emitting light such as infrared rays toward the periphery of the vehicle 1 and capturing the reflected light thereof. At least one lidar 6B is provided at any portion of the vehicle 1.

The camera 6C captures images of the periphery of the vehicle 1 such as the objects (for example, peripheral vehicles (peripheral mobile bodies) and pedestrians) that exist on the periphery of vehicle 1, the shapes of guardrails, curbs, walls, median strips, and roads, and the road markings painted on the roads. The camera 6C may be, for example, a digital camera using a solid-state image sensing device such as a CCD or a CMOS. At least one camera 6C is provided at any portion of the vehicle 1. The camera 6C includes at least a front camera that captures the image of the front of the vehicle 1. The camera 6C may further include a rear camera that captures the image of the rear of the vehicle 1, and a pair of side cameras that captures the images of the lateral sides of the vehicle 1. The camera 6C may be, for example, a stereo camera.

The vehicle sensor 7 includes a speed sensor 7A that detects the speed (vehicle speed) of the vehicle 1, an acceleration sensor 7B that detects the acceleration of the vehicle 1, and an inclination angle sensor 7C that detects the inclination angle of the vehicle 1. The vehicle sensor 7 may further include a yaw rate sensor, and a steering angle sensor that detects the steering angle of front wheels as steered wheels. The vehicle sensor 7 may further include a temperature sensor 7D that measures the temperature of a pad of the brake device 4.

The communication device 8 mediates communication between the devices (the vehicle control device 15 and the navigation device 9) arranged inside the vehicle 1 and the devices (the peripheral vehicles and servers) arranged outside the vehicle 1. The vehicle control device 15 can wirelessly communicate with the peripheral vehicles via the communication device 8.

The navigation device 9 is a device that acquires the current position of the vehicle 1 and provides route guidance to the destination and the like. The navigation device 9 includes a GNSS receiving unit 21, a map storage unit 22, a navigation interface 23, and a route determining unit 24. The GNSS receiving unit 21 identifies the position (latitude and longitude) of the vehicle 1 based on the signals received from artificial satellites (positioning satellites). The map storage unit 22 is composed of a known storage device such as a flash memory or a hard disk, and stores map information.

The map information includes road information including a road type such as an expressway, a toll road, a national road, and a prefectural road, the number of lanes on each road, a center position (a three-dimensional coordinate including longitude, latitude, and height) of each lane, the shapes of road markings such as road partition lines and lane boundaries, the presence or absence of sidewalks, curbs, fences, and the like, the positions of intersections, the positions of lane merging points and lane branching points, the areas of emergency parking zones, the width of each lane, road markings, and the like. The map information may also include traffic regulation information, address information (address and postal code), facility information, telephone number information, and the like. The route determining unit 24 determines a route to the destination based on the position of the vehicle 1 identified by the GNSS receiving unit 21, the destination input from the navigation interface 23, and the map information. Further, when determining the route, the route determining unit 24 may further determine a target lane in which the vehicle 1 should travel by referring to the positions of lane merging points and lane branching points in the map information.

The driving operation device 10 accepts an input operation performed by a driver to control the vehicle 1. The driving operation device 10 includes, for example, a steering wheel, an accelerator pedal, and a brake pedal. The driving operation device 10 may further include a shift lever, a parking brake lever, and the like. A sensor that detects the operation amount of the input operation is attached to each component of the driving operation device 10. The driving operation device 10 outputs a signal indicating the operation amount to the vehicle control device 15.

The HMI 12 notifies an occupant (for example, the driver) of various information by display and sound, and accepts an input operation by the occupant. That is, the HMI 12 functions as a notifier and an input unit.

The vehicle 1 further includes a mode change switch 28 that accepts an operation to switch the level of autonomous driving.

The vehicle control device 15 is an electronic control unit (ECU), namely, a computer, composed of an MPU (microprocessor), ROM, RAM, and the like. The vehicle control device 15 executes various vehicle control as the MPU executes a calculation process according to a program. The vehicle control device 15 may be configured as a single piece of hardware, or may be configured as a unit composed of plural pieces of hardware. Furthermore, at least a portion of each functional unit of the vehicle control device 15 may be realized by hardware such as an LSI, an ASIC, and an FPGA, or may be realized by a combination of software and hardware. The program may be stored in a non-volatile storage device such as an HDD and flash memory of the vehicle control device 15. Alternatively, the program may be stored in a removable storage medium such as a DVD or a CD-ROM and installed in the storage device of the vehicle control device 15 as the storage medium is read by a reading device. Alternatively, the program may be downloaded in the storage device of the vehicle control device 15 via a communication line such as the Internet and installed in the storage device thereof. The vehicle control device 15 as a computer executes a travel control method that will be described later for executing travel control of the vehicle 1. The program causes the vehicle control device 15 to execute the travel control of the vehicle 1 (mobile body). As shown in FIG. 1, the vehicle control device 15 includes a non-transitory computer-readable storage medium 15A including a program 15B for executing the travel control of the vehicle 1. The program 15B, when executed by the vehicle control device 15 as a computer, executes a vehicle control method (mobile body control method) that will be described later.

As shown in FIG. 1, the vehicle control device 15 includes an autonomous driving control unit 35 and a travel control unit 36. The autonomous driving control unit 35 includes an external environment detector 40, an own vehicle position detector 41, an acceleration acquirer 42, a gradient acquirer 43, a preceding vehicle detector 44 (preceding mobile body detector), a following controller 45, an action planner 46, and a mode changer 47.

The autonomous driving control unit 35 combines various types of vehicle control to execute each level of autonomous driving control. For example, in the autonomous driving of level 0, the vehicle control device 15 does not control the vehicle 1, and the driver performs all the driving operations. The autonomous driving of level 1 includes constant speed and inter-vehicle distance control (adaptive cruise control: ACC) and lane keeping assistance control (lane keeping assistance: LKA). In the autonomous driving of levels 2 and 3, the driver monitors the periphery of the vehicle 1, and the vehicle control device 15 executes all the driving operations. In the autonomous driving of levels 2 and 3, the degree to which the driver monitors the periphery of the vehicle 1 is different.

The external environment detector 40 detects obstacles that exist on the periphery of the vehicle 1, the shapes of roads, the presence or absence of sidewalks, and road markings based on the signal from the external environment sensor 6. The obstacles include, for example, guardrails, utility poles, peripheral mobile bodies, and people such as pedestrians. The peripheral mobile body includes vehicles (peripheral vehicles). The external environment detector 40 may detect the positions and distances of the obstacles, the peripheral vehicles, and the like relative to the vehicle 1 based on the signal from at least one of the radar 6A, the lidar 6B, and the camera 6C.

The own vehicle position detector 41 calculates an own vehicle position based on the signals (GNSS signals) received by the GNSS receiving unit 21. Further, the own vehicle position detector 41 recognizes a travel lane that is a lane in which the vehicle 1 is traveling, and a relative position and angle of the vehicle 1 relative to the travel lane. The own vehicle position detector 41 may, for example, recognize the travel lane based on the map information stored in the map storage unit 22 and the position of the vehicle 1 acquired (identified) by the GNSS receiving unit 21. Further, the own vehicle position detector 41 may recognize the relative position and angle of the vehicle 1 relative to the travel lane by extracting, from the map information, the partition lines on the periphery of the vehicle 1 drawn on a road surface and comparing the extracted partition lines with the shapes of the partition lines captured by the camera 6C.

The acceleration acquirer 42 acquires the acceleration (actual acceleration) of the vehicle 1 based on the signal from the acceleration sensor 7B.

The gradient acquirer 43 acquires the gradient of a travel route along which the vehicle 1 is traveling. The gradient acquirer 43 may calculate the gradient of the travel route based on the inclination angle of the vehicle 1 acquired (detected) by the inclination angle sensor 7C. Further, the gradient acquirer 43 may search the map information stored in the map storage unit 22 based on the position of the vehicle 1, and thereby acquiring the gradient of the travel route. The gradient of the travel route becomes a positive value when the travel route has an upward gradient with respect to the travel direction of the vehicle 1, and becomes a negative value when the travel route has a downward gradient with respect to the travel direction thereof.

The preceding vehicle detector 44 detects a preceding vehicle 101 moving ahead of the vehicle 1. For example, the preceding vehicle detector 44 determines the preceding vehicle 101 from among the peripheral vehicles. For example, the preceding vehicle detector 44 may determine, as the preceding vehicle 101, the peripheral vehicle that is arranged on an estimated course of the vehicle 1 and within a prescribed distance from the vehicle 1. The preceding vehicle detector 44 may calculate the estimated course based on the speed of the vehicle 1 and at least one of the yaw rate and the steering angle of the vehicle 1. Further, in a case where there are a plurality of peripheral vehicles that satisfies the condition of the preceding vehicle 101, the preceding vehicle detector 44 may determine, as the preceding vehicle 101, the peripheral vehicle arranged at the shortest distance from the vehicle 1.

Figure 2:
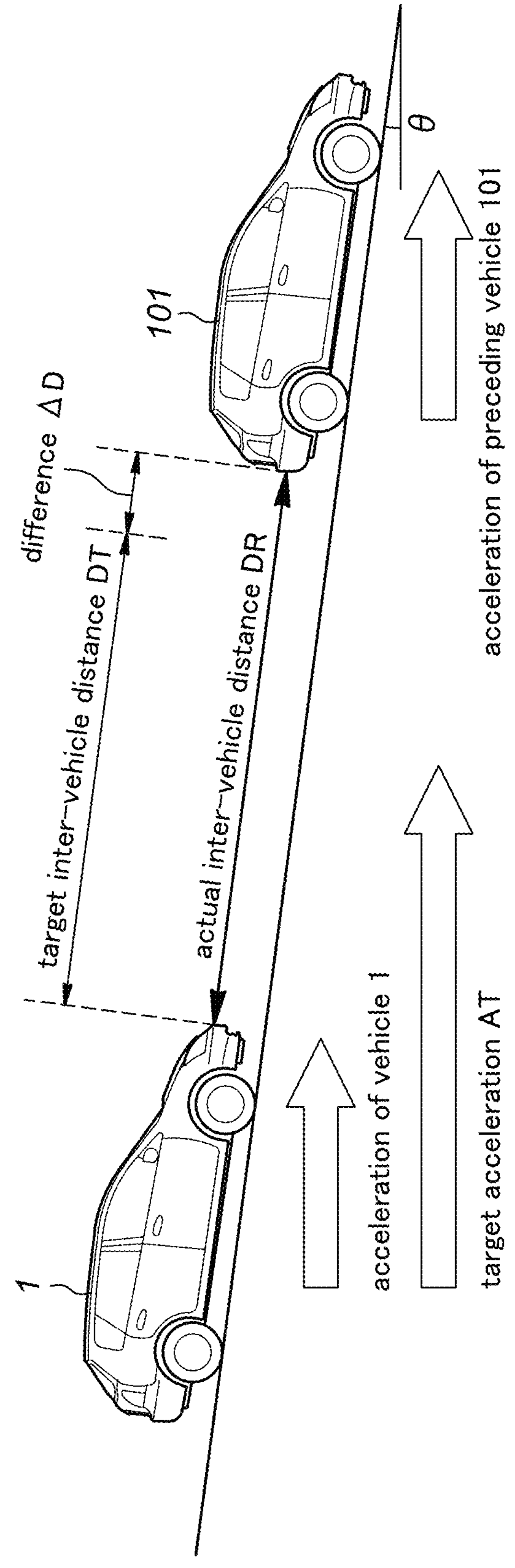
FIG. 2 is an explanatory diagram showing a relationship between the vehicle and a preceding vehicle.

The following controller 45 executes following control such that the vehicle 1 follows the preceding vehicle 101. In the following control, the following controller 45 calculates a target acceleration for controlling the propulsion device 3 and the brake device 4. As shown in FIG. 2, the following controller 45 sets the target acceleration of the vehicle 1 such that the distance (inter-vehicle distance) between the vehicle 1 and the preceding vehicle 101 gets close to a target inter-vehicle distance (target distance). The following controller 45 may set the target acceleration within a range in which the speed of the vehicle 1 is equal to or less than a set vehicle speed. The set vehicle speed may be set by the occupant via the HMI 12 as the upper limit speed of the vehicle 1 during the following control. The target inter-vehicle distance may be a preset value, or may be set by the occupant via the HMI 12.

The action planner 46 sequentially generates an action plan for causing the vehicle 1 to travel along the route. More specifically, first, the action planner 46 determines events for the vehicle 1 to travel in the target lane determined by the route determining unit 24 without coming into contact with any obstacles. The action planner 46 generates a target trajectory on which the vehicle 1 should travel in the future based on the determined events. The target trajectory is a sequence of trajectory points that are the points the vehicle 1 should reach at each time. The action planner 46 may generate the target trajectory based on the target speed (target vehicle speed) and target acceleration set for each event. In a case where the action planner 46 detects the preceding vehicle 101 on the target trajectory, the action planner 46, similar to the following controller 45, may execute the following control to follow the preceding vehicle 101.

The mode changer 47 changes the level of the autonomous driving based on the signal from the mode change switch 28. In a case where level 0 is selected by the mode change switch 28, the mode changer 47 stops the calculations by the following controller 45 and the action planner 46. In a case where level 1 is selected by the mode change switch 28, the mode changer 47 executes the calculations by the following controller 45 and stops the calculations by the action planner 46. In a case where level 2 or higher is selected by the mode change switch 28, the mode changer 47 executes the calculations by the action planner 46 and stops the calculations by the following controller 45.

The travel control unit 36 controls the propulsion device 3, the brake device 4, and the steering device 5 based on the target vehicle speed generated (set) by the following controller 45. Further, the travel control unit 36 controls the propulsion device 3, the brake device 4, and the steering device 5 such that the vehicle 1 passes through the target trajectory generated by the action planner 46 at the scheduled time.

Figure 3:
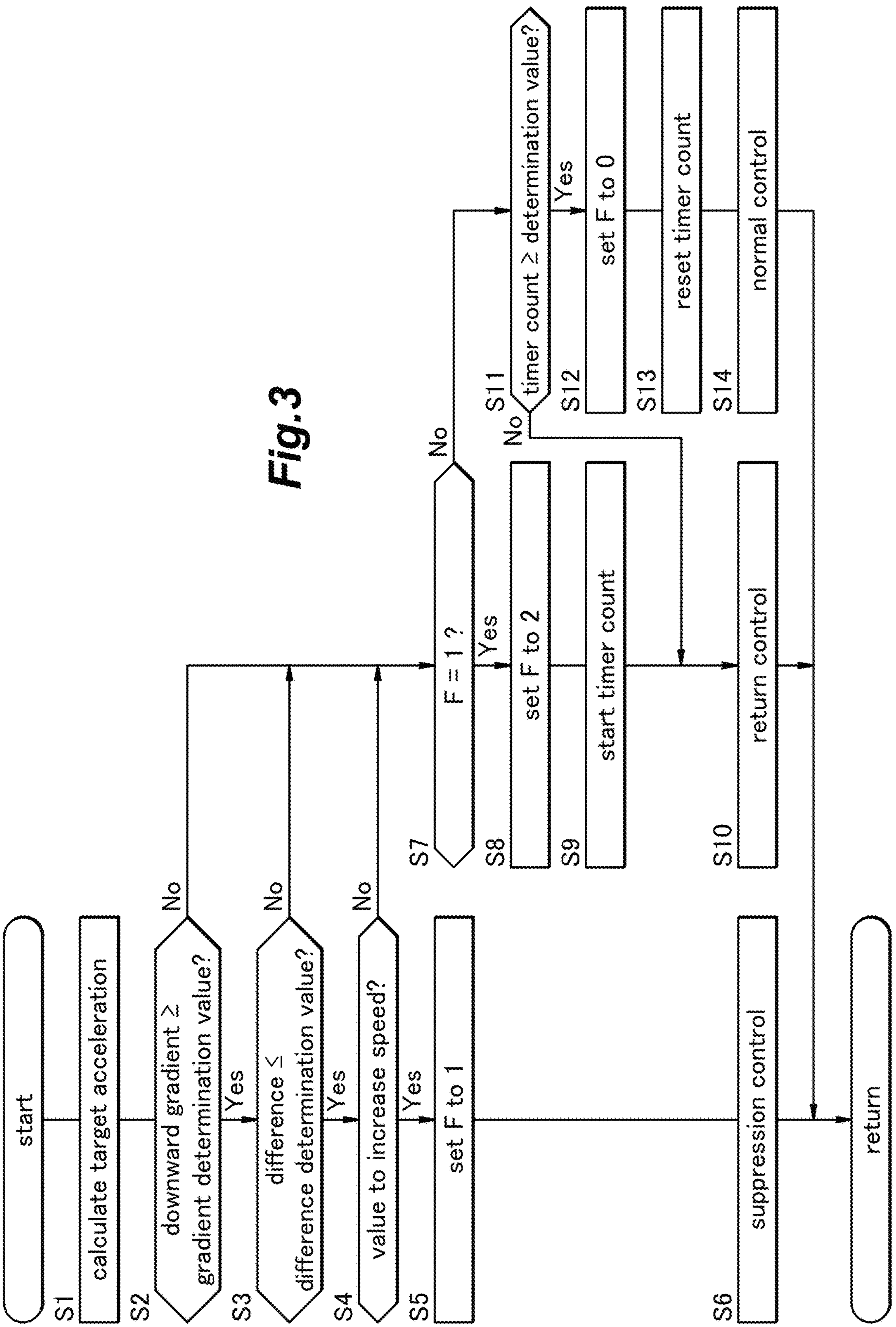
FIG. 3 shows a flowchart of following control.

In the following, the following control executed by the following controller 45 will be described. The following controller 45 may repeat the following control shown in FIG. 3 at time intervals of, for example, several microseconds. First, the following controller 45 calculates the target acceleration of the vehicle 1 (S1). The following controller 45 may calculate the target acceleration based on at least the target inter-vehicle distance and the distance between the vehicle 1 and the preceding vehicle 101. For example, the following controller 45 may calculate the target acceleration of the vehicle 1 based on the difference between the target inter-vehicle distance and the distance (actual inter-vehicle distance) between the vehicle 1 and the preceding vehicle 101 and the relative speed of the preceding vehicle 101 relative to the vehicle 1. The following controller 45 may acquire the distance between the vehicle 1 and the preceding vehicle 101 from the external environment detector 40. The following controller 45 may acquire the speed of the vehicle 1 based on the signal from the speed sensor 7A, may acquire the speed of the preceding vehicle 101 from the external environment detector 40, and may calculate the relative speed of the preceding vehicle 101 relative to the vehicle 1 based on the speed of the vehicle 1 and the speed of the preceding vehicle 101.

For example, the following controller 45 may calculate the target acceleration of the vehicle 1 based on the following Formulae 1 to 3.

$$AT = G1 \times \Delta D + G2 \times \Delta V \quad \text{(Formula 1)}$$

$$\Delta D = DR - DT \quad \text{(Formula 2)}$$

$$\Delta V = V2 - V1 \quad \text{(Formula 3)}$$

"AT" represents the target acceleration [m/s$^2$], "G1" and "G2" represent gains, "AD" represents the difference [m] between the target inter-vehicle distance and the distance between the vehicle 1 and the preceding vehicle 101, "AV" represents the relative speed [m/s] of the preceding vehicle 101 relative to the vehicle 1, "DR" represents the distance [m] (actual inter-vehicle distance) between the vehicle 1 and the preceding vehicle 101, "DT" represents the target inter-vehicle distance [m], "V1" represents the speed of the vehicle 1 [m/s], and "V2" represents the speed of the preceding vehicle 101 [m/s]. The target acceleration is not limited to the formulae 1 to 3, and may be calculated based on various methods.

Next, the following controller 45 determines whether (the absolute value of) the downward gradient of the travel route is equal to or more than a prescribed gradient determination value (S2). The following controller 45 may acquire the gradient of the travel route from the gradient acquirer 43. For example, the gradient determination value may be set between 0 degrees and 10 degrees.

In a case where the downward gradient of the travel route is equal to or more than the gradient determination value (determination result in step S2 is Yes), the following controller 45 determines whether the difference between the target acceleration and the acceleration (actual acceleration) of the vehicle 1 is equal to or less than a prescribed difference determination value (S3).

In a case where the difference between the target acceleration and the acceleration of the vehicle 1 is equal to or less than the difference determination value (determination result in step S3 is Yes), the following controller 45 determines whether the target acceleration is a value to increase the speed of the vehicle 1, that is, whether the target acceleration is a positive value (S4).

In a case where the target acceleration is a value to increase the speed of the vehicle 1 (determination result in step S4 is Yes), the following controller 45 sets the flag F to 1 (S5), and executes suppression control (S6). That is, the following controller 45 starts the suppression control on condition that the downward gradient of the travel route is equal to or more than the gradient determination value, the difference between the target acceleration and the acceleration of the vehicle 1 is equal to or less than the difference determination value, and the target acceleration is a value to increase the speed of the vehicle 1. In the suppression control, the following controller 45 calculates a corrected target acceleration by reducing the absolute value of the target acceleration. The following controller 45 may calculate the corrected target acceleration by multiplying the target acceleration by a prescribed correction gain. The correction gain may be set to a value more than 0 and less than 1, for example. Alternatively, the following controller 45 may calculate the corrected target acceleration by subtracting a prescribed correction amount from the target acceleration. The initial value of the flag F set in step S5 may be 0.

In the suppression control, the following controller 45 outputs the calculated corrected target acceleration to the travel control unit 36. Then, the travel control unit 36 controls the propulsion device 3 and the brake device 4 based on the corrected target acceleration. That is, while the following controller 45 is executing the suppression control, the travel control unit 36 controls the propulsion device 3 and the brake device 4 based on the corrected target acceleration instead of the target acceleration.

The following controller 45 determines whether the flag F is 1 (S7) in a case where the downward gradient of the travel route is not equal to or more than the gradient determination value (determination result in step S2 is No), in a case where the difference between the target acceleration and the acceleration of the vehicle 1 is not equal to or less than the difference determination value (determination result in step S3 is No), or in a case where the target acceleration is not a value to increase the speed of the vehicle 1 (determination result in step S4 is No). In step S7, the following controller 45 determines whether the suppression control has been executed in the previous following control.

In a case where the flag F is 1 (determination result in step S7 is Yes), the following controller 45 sets the flag F to 2 (S8), then starts a timer count (S9), and then executes return control (S10). The return control will be described in detail later. The timer count measures the duration of the return control.

In a case where the flag F is not 1 (determination result in step S7 is No), the following controller 45 determines whether the timer count is equal to or more than a prescribed determination value (S11). In Step S11, the following controller 45 determines whether the duration of the return control has reached a prescribed period based on the timer count. In a case where the timer count is less than the determination value (determination result in step S11 is No), the following controller 45 executes the return control (S10).

In a case where the timer count is equal to or more than the determination value (determination result in step S11 is Yes), the following controller 45 sets the flag F to 0 (S12), then resets the timer count (S13), and then executes normal control (S14).

In the normal control, the following controller 45 outputs the calculated target acceleration to the travel control unit 36. Then, the travel control unit 36 controls the propulsion device 3 and the brake device 4 based on the target acceleration.

The following controller 45 suppresses the changing amount of the absolute value of the target acceleration in the return control executed after the suppression control is stopped. Accordingly, the target acceleration is prevented from changing suddenly after the suppression control is stopped. Accordingly, the acceleration of the vehicle 1 is prevented from changing suddenly. In the return control (return process), the following controller 45 may suppress the changing amount of the absolute value of the target acceleration based on the difference between the target acceleration and the acceleration of the vehicle 1.

In the return control, the following controller 45 may calculate a second corrected target acceleration, for example, by multiplying the target acceleration by a return gain, and output the second corrected target acceleration to the travel control unit 36. Then, the travel control unit 36 may control the propulsion device 3 and the brake device 4 based on the second corrected target acceleration instead of the target acceleration. The return gain may be set to a value more than 0 and less than 1, and more than the correction gain. Further, the return gain may incrementally increase up to 1 as the timer count increases. Accordingly, the second corrected target acceleration gets close to the target acceleration over time.

When the following controller 45 is executing the suppression control, the HMI 12 may notify the occupant of the vehicle 1 that the suppression control is being executed. When the following controller 45 is executing the suppression control, the following controller 45 may output a signal to the HMI 12, and the HMI 12 may give a notification to the occupant by video, images, or audio in response to the signal from the following controller 45. Accordingly, the occupant can recognize that the suppression control is being executed, and is less likely to feel uncomfortable.

The following controller 45 may stop the suppression control when an input operation on the driving operation device 10 is detected. The driving operation device 10 accepts the driving operation by the occupant of the vehicle 1. The driving operation device 10 may include at least one of an accelerator pedal, a brake pedal, and a steering wheel. Accordingly, the occupant can stop the suppression control by his/her own operation.

The following controller 45 may stop the following control when the temperature of the brake device 4 is equal to or more than a prescribed temperature determination value. The following controller 45 may acquire the temperature of the pad of the brake device 4 based on the signal from the temperature sensor 7D. Accordingly, the use of the brake device 4 according to the following control is stopped, so that the fade of the brake device 4 is suppressed. Further, the following controller 45 may stop the following control when the preceding vehicle 101 ceases to be a following target.

The action and effect of the vehicle control device 15 according to the above embodiment will be described. The following controller 45 starts the suppression control on condition that the downward gradient of the travel route is equal to or more than the gradient determination value, the difference between the target acceleration and the acceleration of the vehicle 1 is equal to or less than the difference determination value, and the target acceleration is a value to increase the speed of the vehicle 1 (determination results in steps S2, S3, and S4 are all Yes). In the suppression control, the following controller 45 calculates the corrected target acceleration, the absolute value of which is smaller than the target acceleration. The travel control unit 36 controls the propulsion device 3 and the brake device 4 based on the corrected target acceleration instead of the target acceleration. Accordingly, the change in the acceleration of the vehicle 1 becomes slower. Accordingly, the distance between the vehicle 1 and the preceding vehicle 101 is prevented from becoming shorter, so that the use of the brake device 4 is suppressed. Consequently, the temperature rise and fade of the brake device 4 are suppressed. When the suppression control is executed, the difference between the target acceleration and the acceleration of the vehicle 1 is equal to or less than the difference determination value. Accordingly, even if the absolute value of the target acceleration is suppressed, the distance between the vehicle 1 and the preceding vehicle 101 is prevented from changing significantly. In particular, when the travel route has a downward gradient, the acceleration to increase the speed of the vehicle 1 is applied to the vehicle 1 due to the gravity. Accordingly, even if the target acceleration to increase the speed of the vehicle 1 is suppressed, the following ability for the vehicle 1 to follow the preceding vehicle 101 is maintained. Accordingly, the vehicle control device 15 can maintain the following ability to follow the preceding vehicle 101 while suppressing the fade of the brake device 4.

When the difference between the target acceleration and the acceleration of the vehicle 1 becomes more than the difference determination value (determination result in step S3 is No), the following controller 45 stops the suppression control. Accordingly, the following controller 45 can maintain the following ability to follow the preceding vehicle 101. When the difference between the target acceleration and the acceleration of the vehicle 1 is more than the difference determination value, the distance between the preceding vehicle 101 (preceding mobile body) and the vehicle 1 (mobile body) is more likely to change. In such a case, the following controller 45 stops the suppression control to improve the responsiveness of the acceleration.

The following controller 45 executes the return control for a prescribed period after the suppression control is stopped. Accordingly, the acceleration of the vehicle 1 is prevented from increasing suddenly. The following controller 45 executes the return control for the prescribed period and then executes the normal control.

This concludes the descriptions of the specific embodiment, but the present invention can be widely modified without being limited to the above embodiment. In another embodiment, the process of step S4 of the following control may be omitted. In this case, the following controller 45 may execute the process of step S5 in a case where the determination result of step S3 is Yes, and execute the process of step S7 in a case where the determination result of step S2 or step S3 is No.

The invention claimed is:

1. A mobile body control device configured to execute travel control of a mobile body, the mobile body control device comprising:

an acceleration acquirer configured to acquire an actual acceleration of the mobile body;

a gradient acquirer configured to acquire a gradient of a travel route along which the mobile body is traveling;

a preceding mobile body detector configured to detect a preceding mobile body moving ahead of the mobile body; and a following controller configured to execute following control to calculate a target acceleration for controlling a propulsion device and a brake device such that the mobile body follows the preceding mobile body, wherein the following controller is configured to calculate the target acceleration based on a target distance and a distance between the mobile body and the preceding mobile body, and to start suppression control to calculate a corrected target acceleration by reducing an absolute value of the target acceleration on condition that a downward gradient of the travel route is equal to or more than a prescribed gradient determination value, a difference between the target acceleration and the actual acceleration is equal to or less than a prescribed difference determination value, and the target acceleration is a value to increase a speed, and while the following controller is executing the suppression control, the propulsion device and the brake device are controlled based on the corrected target acceleration instead of the target acceleration.

2. The mobile body control device according to claim 1, wherein the following controller is configured to stop the following control when a temperature of the brake device is equal to or more than a prescribed temperature determination value.

3. The mobile body control device according to claim 1, wherein the following controller is configured to calculate the target acceleration such that the distance between the mobile body and the preceding mobile body gets close to the target distance.

4. The mobile body control device according to claim 1, wherein the following controller is configured to stop the suppression control when the difference between the target acceleration and the actual acceleration becomes more than the prescribed difference determination value.

5. The mobile body control device according to claim 1, wherein the following controller is configured to stop the suppression control when an input operation on a driving operation device is detected, the driving operation device being configured to accept a driving operation by an occupant of the mobile body.

6. The mobile body control device according to claim 1, wherein the following controller is configured to stop the following control when the preceding mobile body ceases to be a following target.

7. The mobile body control device according to claim 4, wherein after the suppression control is stopped, the following controller is configured to execute a return process to suppress a changing amount of an absolute value of the target acceleration.

8. The mobile body control device according to claim 7, wherein in the return process, the following controller is configured to suppress the changing amount of the absolute value of the target acceleration based on the difference between the target acceleration and the actual acceleration.

9. The mobile body control device according to claim 1, further comprising a notifier configured to notify an occupant of the mobile body that the suppression control is being executed when the following controller is executing the suppression control.

10. A mobile body control method executed by a computer to execute travel control of a mobile body, the mobile body control method comprising:

acquiring an actual acceleration of the mobile body;

acquiring a gradient of a travel route along which the mobile body is traveling;

detecting a preceding mobile body moving ahead of the mobile body;

executing following control to calculate a target acceleration for controlling a propulsion device and a brake device such that the mobile body follows the preceding mobile body;

calculating the target acceleration based on a target distance and a distance between the mobile body and the preceding mobile body; and starting suppression control to calculate a corrected target acceleration by reducing an absolute value of the target acceleration on condition that a downward gradient of the travel route is equal to or more than a prescribed gradient determination value, a difference between the target acceleration and the actual acceleration is equal to or less than a prescribed difference determination value, and the target acceleration is a value to increase a speed, wherein while the suppression control is being executed, the propulsion device and the brake device are controlled based on the corrected target acceleration instead of the target acceleration.

11. A non-transitory computer-readable storage medium, comprising a program for executing travel control of a mobile body, wherein the program, when executed by a computer, executes a mobile body control method comprising:

acquiring an actual acceleration of the mobile body;

acquiring a gradient of a travel route along which the mobile body is traveling;

detecting a preceding mobile body moving ahead of the mobile body;

executing following control to calculate a target acceleration for controlling a propulsion device and a brake device such that the mobile body follows the preceding mobile body;

calculating the target acceleration based on a target distance and a distance between the mobile body and the preceding mobile body; and starting suppression control to calculate a corrected target acceleration by reducing an absolute value of the target acceleration on condition that a downward gradient of the travel route is equal to or more than a prescribed gradient determination value, a difference between the target acceleration and the actual acceleration is equal to or less than a prescribed difference determination value, and the target acceleration is a value to increase a speed, wherein while the suppression control is being executed, the propulsion device and the brake device are controlled based on the corrected target acceleration instead of the target acceleration.

* * * * *